March 31, 1970   R. B. BOWER   3,503,636
CONDUIT JOINT ASSEMBLY
Filed Nov. 29, 1966

INVENTOR,
RAY B. BOWER

BY Burns, Doane, Benedict, Swecker & Mathis
ATTORNEYS

United States Patent Office 3,503,636
Patented Mar. 31, 1970

3,503,636
CONDUIT JOINT ASSEMBLY
Ray B. Bower, 239 Tremont Ave.,
Greensburg, Pa. 15601
Filed Nov. 29, 1966, Ser. No. 597,603
Int. Cl. F16l 37/00
U.S. Cl. 285—305                        3 Claims

ABSTRACT OF THE DISCLOSURE

A joint assembly for pipes in which one pipe end is in the form of a spigot end and the other pipe end is in the form of a bell end with the ends being assembled end to end in telescoping relation. Cooperating frusto-conical engagement surfaces on the respective pipe ends include inserts that extend continuously from the end face of the spigot pipe end toward the end face of the bell pipe end. The inserts each have circumferential grooves which define an annular retainer for a seal ring. The outer surfaces of the inserts are in direct engagement with each other and the seal ring serves to prevent the leakage of fluid through the joint and also locks the joint together.

---

The present invention relates to a conduit joint assembly and, more particularly, to a joint assembly providing a sealed connection between ends of concrete pipe sections.

Concrete pipelines are widely used in many fluid carrying applications and have been found particularly useful for sanitary sewers and the like. In construction of a concrete pipeline, separate lengths of concrete pipes are laid end to end, the joints therebetween being sealed by a pipe joint assembly. As pipelines are sometimes subject to rough handling and accidental displacement after laying, it is important that the pipe joint assembly provide great strength. It is also important that pipe joint assemblies for concrete pipelines be noncorrosive, as the pipelines sometimes carry acid materials such as sewage. Because concrete pipelines are generally assembled in the field, it is important that concrete pipe joint assemblies be easy to install, and yet provide a permanent seal.

Accordingly, a general object of the present invention is a provision of a concrete pipe joint assembly which becomes an integral and secure part of the concrete pipe section.

Another object of the present invention is the provision of a concrete pipe joint assembly for providing a noncorrosive seal.

A further object of the present invention is a provision of concrete pipeline joint assembly which is easily and quickly installed on site and yet which provides an extremely strong joint with excellent sealing.

In achieving these and other objects that will be apparent hereinafter, the present invention contemplates a pair of mating pipe joint inserts adapted to be rigidly cast in the ends of concrete pipes. Each of the inserts is hollow and has a frusto-conical shape with a circular groove in order to receive a substantial portion of an O-ring seal. Each of the inserts additionally include a circumferential rib portion defined in a side wall portion in order to rigidly lock the inserts to the concrete pipe.

Figure 1:
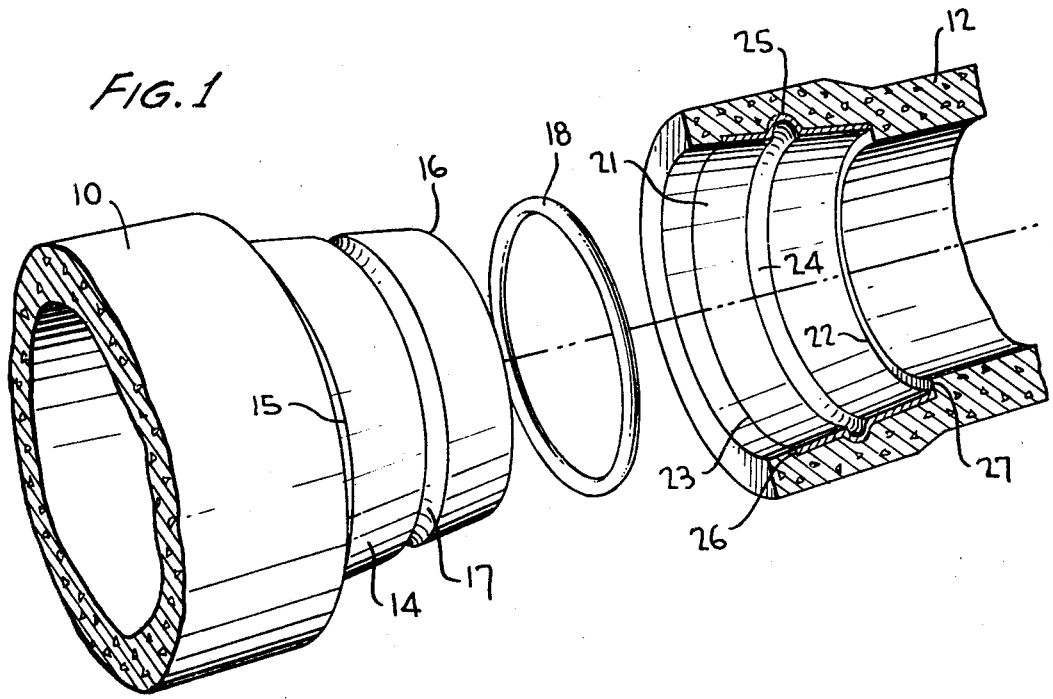
Figure 2:
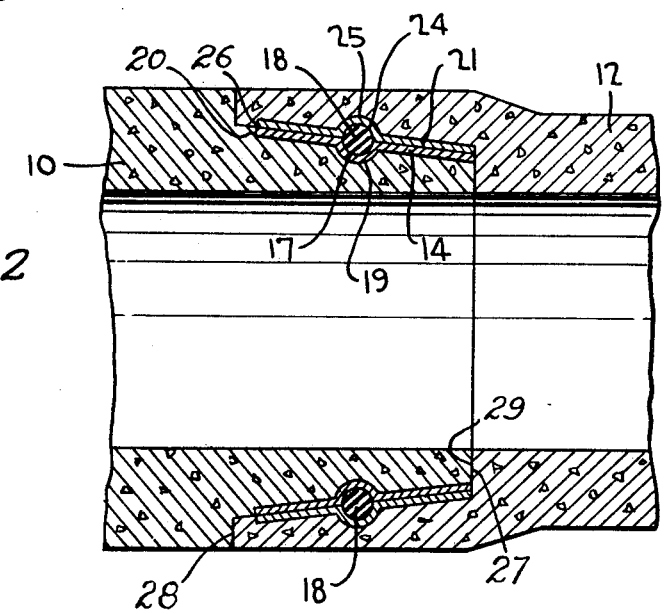

The invention and its many advantages will be further understood with reference to the following detailed description of the accompanying drawings wherein FIGURE 1 is an exploded perspective view, partially in cross section, of a concrete pipe joint according to the present invention; and FIGURE 2 is a cross sectional side view of a portion of the concrete pipe joint shown in FIGURE 1, with the mating parts assembled.

Referring to FIGURE 1, a first concrete pipe section 10 is shown spaced slightly apart in an end-to-end relationship with a second concrete pipe section 12. The end of the concrete pipe section 10 illustrated has a reduced diameter commonly known as the male, or tongue end and is adapted to be received by the increased diameter female, or bell end of the concrete pipe section 12 in order to provide a pipe joint. Fixedly connected to the male end of the concrete pipe 10 is a male hollow metallic insert 14, which has a frusto-conical configuration with radially inner and outer side walls of a constant lateral width sloping outwardly from a large end opening 15 to a small end opening 16.

The hollow frusto-conical insert 14 includes a circular grooved portion 17 which extends about the periphery of the outer side of the insert in order to receive a resilient O-ring seal 18. The grooved portion 17 has a depth substantially equal to the cross-sectional radius of the seal 18 in order to provide excellent sealing and locking characteristics. The insert 14 also includes a circular rib portion 19, shown in FIGURE 2, which extends about the circumference of the inner side wall of the insert 14 in an aligned position with the groove 16. The small diameter longitudinal end of insert 14 is disposed flush with the longitudinal end of pipe section 10, while the large diameter longitudinal end of insert 14 abuts a shoulder stop 20 formed in the pipe section 10.

Securely received in a recess provided in the inner wall of the bell end of the concrete pipe 12 is a female hollow frusto-conical insert 21 shown in cross section. Insert 21 has radially inner and outer walls sloping outwardly from a small end opening 22 to a large end opening 23 which is dimensioned to receive the insert 14. The second insert 21 includes a circular grooved portion 24 disposed about the circumference of the inner side wall of the insert 21, rather than in the outer side wall as is the grooved portion 17 in insert 14. The grooved portion 24 also has a depth substantially equal to the radius of the seal 18 in order to provide a secure seal. Further, the insert 21 includes a circular rib portion 25 which extends about the periphery of the outer side wall of the insert 21.

The large end opening 23 of insert 21 is recessed from the longitudinal end of pipe section 12 and abuts a concrete locking shoulder 26. Similarly, the small end opening 22 of insert 21 abuts a concrete locking shoulder 27. The female insert 21 is thus an integral, securely connected part of the pipe section end which can withstand extreme pressures.

FIGURE 2 illustrates the assembled joint wherein insert 14 is received inside insert 21 and the O-ring 18 is sealingly retained in the grooved portions 17 and 24. Because the depths of the grooved portions are substantially equal to the radius of the O-ring 18, the present joint provides a very tight seal as well as a secure locking action. Further, as shown in FIGURE 2, the rib portions 19 and 25 abut portions of the concrete pipe and thus firmly secure the metallic inserts to the concrete pipe ends.

The present metallic inserts are installed in concrete pipe forms, the liquid concrete poured around the inserts, and the concrete is then cured. The present metallic inserts may thus be firmly and concentrically attached to all sizes of concrete pipes without worry about variances in the dimensions of the pipes, and without increasing the normal size of the pipe ends.

The novel construction of the present metallic inserts also allows ease in manufacture, as a strip of metal may be cut to the desired dimension and the grooved portion and rib portion may be rolled into the metal strips in one operation. The metal may then be formed to the desired diameter and spot welded together to form a rigid member. This method of manufacture of the present inserts allows a very precise groove to be provided in the inserts in order to closely fit the desired size O-ring. The present pipe joint assembly provides such a strong joint that the O-ring may be of a size in excess of the groove area without danger of popping off.

The concrete pipe joint of the present invention is simply assembled without the time-consuming addition of a sealing compound sometimes required by joints heretofore available. The flexible O-ring seal 18 is placed in the groove 16 of insert 14 and the male end of pipe 10 is joined with the female end of pipe 12. The frusto-conical shape of the insert 14 enables ease in assembly of the O-ring and subsequent entry into insert 21. The metallic insert 21 will slide over the insert 14 and O-ring 18 until the groove 24 locks in place over the exposed portion of the O-ring 18, as shown in FIGURE 2. The shoulder 27 and the radial shoulder 28 provide a positive stop to the radial end face 29 of the pipe section 10, thus assuring proper positioning of the O-ring 18 in the grooved portions. The frusto-conical shapes of the inserts 14 and 21 aid in retaining the O-ring in position even in the occurrence of extremely high fluid pressures, as the sloping side walls prevent the O-ring from rolling out of position. The present joint may be forced apart at a later time in order to replace the O-ring 18 in case of wear. The present invention thus provides a close metal-to-metal pipe joint, in addition to providing a fluid tight O-ring seal which also serves as a locking member.

The metallic inserts of the present invention may be constructed from any suitable material which is resistant to corrosive action from acid sewage and the like, as for instance, 30-gauge steel with a plastic coating. Other materials, such as stainless steel, galvanated steel or fiberglass, may be suitable to serve as material from which to construct the present device.

While a preferred embodiment has been described for the invention, it should be understood that modifications of the present apparatus which do not depart from the essence of the present invention are obvious to those skilled in the art.

I claim:
1. A joint assembly of a pair of fabricated non-metallic pipe sections in end to end relation, said assembly comprising:
   one of said pipe section having a spigot end and the other of said pipe sections having a bell end, said spigot end being inserted in said bell end in telescoping coaxial relation,
   said spigot end having a radial end face and a radial shoulder spaced axially from said end face and having a tapered engagement surface between said shoulder and said end face, said engagement surface having a tapered recessed portion extending continuously from adjacent said shoulder to said end face, said tapered recessed portion being provided with a circumferential groove,
   said bell end having a radial end face and a radial shoulder spaced axially from said bell end face and having a tapered engagement surface between said bell shoulder and said bell end face, said bell engagement surface having a tapered recessed portion extending continuously from said shoulder to adjacent said end face, said tapered recessed portion being provided with a circumferential groove,
   said spigot end face being in abutting relation with said bell shoulder and said spigot shoulder being in abutting relation with said bell end face to prevent relative axial movement,
   said bell and spigot grooves being in register with each other, and the portions of said bell and spigot engagement surfaces adjacent said recessed portions being in engagement with one another,
   said spigot engagement surface including a metallic insert in said recessed portion, said insert extending from said spigot end face to adjacent said spigot shoulder and having an external substantially frusto-conical surface, said bell engagement surface including a metallic insert in said recessed portion, said bell insert having an external substantially frusto-conical surface,
   said inserts each having a circumferential groove therein, said insert grooves defining rib portions projecting into said bell and spigot grooves to resist axial displacement of said inserts, said insert grooves being in register with each other to define an annular seal retainer, and a resilient seal ring in said insert grooves in sealing relation with said inserts, said frusto-conical surfaces mating with each other and being in direct facial, metal to metal sealing engagement with each other at least at the portions thereof adjacent the ends of said recessed portions, whereby an effective seal is provided and the seal ring also serves as a locking member for the joint assembly.

2. The joint assembly according to claim 1 wherein said inserts have a uniform thickness.

3. The joint assembly according to claim 1 wherein said seal ring substantially fills said insert grooves.

References Cited

UNITED STATES PATENTS

| | | | |
|---|---|---|---|
| 2,735,505 | 2/1956 | Kleiman | 285—179 |
| 1,344,779 | 6/1920 | Trammell | 285—288 |
| 1,530,105 | 3/1925 | Blufton | 285—288 X |
| 1,869,105 | 7/1932 | Johnson | 285—288 X |
| 1,959,511 | 5/1934 | Venzie | 285—288 |
| 2,630,338 | 3/1953 | Snyder | 285—321 X |
| 1,158,416 | 10/1915 | Boyle | 285—336 X |
| 1,900,145 | 3/1933 | Whiting | 285—288 |
| 1,979,470 | 11/1934 | Johnston | 285—291 X |
| 2,470,818 | 5/1949 | Hirsch | 285—288 |
| 2,537,659 | 1/1951 | Eisner et al. | 285—332.3 X |
| 3,228,425 | 1/1966 | Pacella | 285—291 X |
| 3,334,929 | 8/1967 | Wiltse | 285—305 |

FOREIGN PATENTS 503,251  11/1951  Belgium.

DAVID J. WILLIAMOSKY, Primary Examiner
WAYNE L. SHEDD, Assistant Examiner

U.S. Cl. X.R.
285—374